(12) United States Patent
Nordbruch et al.

(10) Patent No.: US 12,125,387 B2
(45) Date of Patent: Oct. 22, 2024

(54) CONCEPT FOR ASSISTING A MOTOR VEHICLE

(71) Applicant: Robert Bosch GmbH, Stuttgart (DE)

(72) Inventors: Stefan Nordbruch, Leonberg (DE); Anna Gaszczak, Fellbach (DE); Felix Hess, Benningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 60 days.

(21) Appl. No.: 18/055,232

(22) Filed: Nov. 14, 2022

(65) Prior Publication Data

US 2023/0186772 A1 Jun. 15, 2023

(30) Foreign Application Priority Data

Dec. 9, 2021 (DE) ............ 10 2021 214 048.3

(51) Int. Cl.
| | |
|---|---|
| *G08G 1/16* | (2006.01) |
| *B60W 30/06* | (2006.01) |
| *G07C 5/00* | (2006.01) |
| *G08G 1/14* | (2006.01) |
| *H04W 4/38* | (2018.01) |
| *H04W 4/44* | (2018.01) |

(52) U.S. Cl.
CPC ............ *G08G 1/168* (2013.01); *H04W 4/38* (2018.02); *H04W 4/44* (2018.02); *B60W 30/06* (2013.01); *B60W 2556/45* (2020.02); *G07C 5/008* (2013.01); *G08G 1/146* (2013.01)

(58) Field of Classification Search
CPC ......... G08G 1/168; G08G 1/146; H04W 4/38; H04W 4/44; B60W 30/06; B60W 2556/45; G07C 5/008
See application file for complete search history.

(56) References Cited

U.S. PATENT DOCUMENTS

| 2019/0132709 A1* | 5/2019 | Graefe | ............... G05D 1/028 |
| 2020/0280827 A1* | 9/2020 | Fechtel | ............... H04W 80/08 |

FOREIGN PATENT DOCUMENTS

| DE | 102016223830 A1 | 5/2018 | |
| DE | 102018212998 A1 * | 2/2020 | ......... B62D 15/0285 |
| EP | 3882733 B1 * | 11/2022 | ......... B60W 60/001 |
| WO | 2018029101 A1 | 2/2018 | |

* cited by examiner

*Primary Examiner* — Adnan Aziz
*Assistant Examiner* — James E Munion
(74) *Attorney, Agent, or Firm* — NORTON ROSE FULBRIGHT US LLP; Gerard A. Messina

(57) ABSTRACT

A system for the infrastructure-based assistance of a motor vehicle driven in an at least semi-automated manner within a parking facility. The system includes: multiple base units, each connected to a surroundings sensor which detect an area of the parking facility. The base units aid the motor vehicle during its drive through the respective area driven in an at least semi-automated manner based on surroundings sensor data of the respective surroundings sensor corresponding to the respective detection. Infrastructure assistance data are ascertained based on the surroundings sensor data, which are transmitted wirelessly to the motor vehicle. Each base unit is responsible for one area. The responsibility for aiding the motor vehicle is forwarded from base station to base station as the motor vehicle drives through the individual areas.

9 Claims, 2 Drawing Sheets

CONCEPT FOR ASSISTING A MOTOR VEHICLE

CROSS REFERENCE

The present application claims the benefit under 35 U.S.C. § 119 of German Patent Application No. DE 10 2021 214 048.3 filed on Dec. 9, 2021, which is expressly incorporated herein by reference in its entirety.

FIELD

The present invention relates to a system for the infrastructure-based assistance of a motor vehicle driven in an at least semi-automated manner within a parking facility, to a method for the infrastructure-based assistance of a motor vehicle driven in an at least semi-automated manner within a parking facility, to a computer program and to a machine-readable memory medium.

BACKGROUND INFORMATION

AVP stands for "Automated Valet Parking" and may be translated into German as "Automatischer Parkservice."

Parking facilities that are able to provide an AVP functionality for a motor vehicle include multiple surroundings sensors, each of which detects an area of the parking facility. The surroundings sensor data corresponding to the detection are transmitted from the surroundings sensors to a central server, which evaluates the surroundings sensor data and, based on the evaluation, ascertains infrastructure assistance data, on the basis of which the motor vehicle is able to be driven in an at least semi-automated manner within the parking facility. The infrastructure assistance data are transmitted wirelessly, for example, via WLAN, to the motor vehicle.

German Patent Application No. DE 10 2016 223 830 A1 describes a method for operating an automated vehicle.

PCT Patent Application No. WO 2018/029101 A1 describes a control of an autonomous vehicle.

U.S. Patent Application Publication No. US 2019/0132709 A1 describes a sensor network.

SUMMARY

An object of the present invention to provide for the efficient infrastructure-based assistance of a motor vehicle driven in an at least semi-automated manner within a parking facility.

This object may be achieved with the aid of features of the present invention. Advantageous embodiments of the present invention are disclosed herein.

According to one first aspect, a system is provided for the infrastructure-based assistance of a motor vehicle driven in an at least semi-automated manner within a parking facility. According to an example embodiment of the present invention, the system includes:
- a first base unit, which is situated within the parking facility, the first base unit being connected to a first surroundings sensor situated within the parking facility in the surroundings of the first base unit and detecting a first area of the parking facility,
- the first base unit being configured to ascertain first infrastructure assistance data for the infrastructure-based assistance of the motor vehicle during a first, at least semi-automated drive through the first area based on first surroundings sensor data of the first surroundings sensor representing the detected first area,
- a second base unit, which is situated within the parking facility spaced apart from the first base unit and is connected in series to the first base unit,
- the second base unit being connected to a second surroundings sensor situated within the parking facility in the surroundings of the second base unit and detecting a second area of the parking facility,
- the second base unit being configured to ascertain second infrastructure assistance data for the infrastructure-based assistance of the motor vehicle during an at least semi-automated drive through the second area based on second surroundings data of the second surroundings sensor representing the detected second area,
- the first base unit being configured to ascertain first transfer data for the transfer of the infrastructure-based assistance of the motor vehicle from the first base unit to the second base unit,
- the second base unit being configured to take over the infrastructure-based assistance of the motor vehicle from the first base unit based on the first transfer data,
- the second base unit being configured to ascertain the second infrastructure assistance data based on the first transfer data, and at least one wireless communication interface, which is configured to transmit the correspondingly ascertained infrastructure assistance data to the motor vehicle.

According to one second aspect of the present invention, a method is provided for the infrastructure-based assistance of a motor vehicle driven in an at least semi-automated manner within a parking facility using the system provided according to the first aspect. According to an example embodiment of the present invention, the method includes the following steps:
- Ascertaining, with the aid of the first base unit, first infrastructure assistance data for the infrastructure-based assistance of the motor vehicle during an at least semi-automated drive through the first area based on the first surroundings sensor data,
- transmitting the ascertained first infrastructure assistance data to the motor vehicle with the aid of the at least one wireless communication interface,
- ascertaining first transfer data for the transfer of the infrastructure-based assistance of the motor vehicle from the first base unit to the second base unit with the aid of the first base unit,
- taking over the infrastructure-based assistance of the motor vehicle from the first base unit with the aid of the second base unit based on the first transfer data,
- ascertaining, with the aid of the second base unit, second infrastructure assistance data for the infrastructure-based assistance of the motor vehicle during an at least semi-automated drive through the second area based on the second surroundings sensor data and based on the first transfer data,
- transmitting the ascertained second infrastructure assistance data to the motor vehicle with the aid of the at least one wireless communication interface.

According to one third aspect of the present invention, a computer program is provided, which includes commands which, when the computer program is executed by a computer, for example, by the system according to the first aspect, prompt the computer to carry out a method according to the second aspect.

According to one fourth aspect of the present invention, a machine-readable memory medium is provided, on which the computer program according to the first aspect is stored.

The present invention is based on and includes the finding that the above object may be achieved in that the system is implemented as an edge computing architecture. Edge computing, in contrast to cloud computing, refers to the decentralized data processing at the edge of a network, the so-called edge. This means that according to the concept described here, it is provided that the ascertainment of the infrastructure assistance data is no longer entrusted to a central server, for example, to a parking facility management system, but is carried out by multiple base units, which are situated within the parking facility. This advantageously shortens a transfer distance between the surroundings sensor and the entity that ascertains the infrastructure assistance data based on the surroundings sensor data, in the present case, the base unit, as compared to the central server, which is generally situated in a server room usually located outside the parking facility. The base units self-sufficiently ascertain the infrastructure assistance data and thus self-sufficiently aid the motor vehicle during the drive driven in an at least semi-automated manner, in particular, during an AVP drive. The base units are thus each in charge of and responsible for individual areas. This means, in particular, that the base units assist only motor vehicles during an at least semi-automated drive, which drive or intend to drive through the corresponding area. For example, a motor vehicle that drives in an at least semi-automated manner through the first area, is aided, in particular, only by the first base unit, not by the second base unit and vice versa.

According to the present invention disclosed herein, it is further provided that the base unit does not use the surroundings sensor data of all surroundings sensors that are situated within the parking facility in order to ascertain the infrastructure assistance data, but only a lesser number, for example, 4 to 16, of surroundings sensors. Thus, the base unit or base units is/are connected only to surroundings sensors that are located in the respective surroundings of the base units. This yields the technical advantage that an effort in laying data cables for the purpose of transferring surroundings sensor data may be efficiently reduced.

This further yields the technical advantage that a required minimal bandwidth for the data transfer of the surroundings sensor data may be efficiently reduced, since fewer surroundings sensor data are required to be transmitted to an individual base unit as compared to the approach using the central server.

This further yields the technical advantage that the base units may be more weakly equipped in terms of hardware as compared to a central server, since they are not required to process the same amount of surroundings sensor data compared to the central server, i.e., to the parking facility management system.

The two base units being connected to one another in series yields, for the example, the technical advantage that the base units are able to receive in each case from directly adjacent base units the surroundings sensor data of the at least one surroundings sensor that is connected to the other base unit. This is as seen in contrast to a tree topology, which is normally used in the approach including the central server. Compared to a tree topology, an effort for a laying of data cables for the purpose of transferring the surroundings data is reduced in the case of a daisy chain. The term "Daisy Chain," "Gänseblümchenkette" in German, is used in English for such a topology (two base units are connected to one another in series.) The two base units are, for example, situated directly adjacent to one another.

The ascertainment of first transfer data for the transfer of the infrastructure-based assistance of the motor vehicle from the first base unit to the second base unit with the aid of the first base unit and the use of these transfer data with the aid of the second base unit in order to ascertain second infrastructure assistance data yields, in particular, the technical advantage that the transfer may be efficiently carried out. The drive of the motor vehicle infrastructure-based initially by the first base unit through the first area may thus be advantageously continued efficiently via an assistance by the second base unit after taking over the infrastructure-based assistance, so that the motor vehicle is able to be driven infrastructure-based by the second base unit through the second area in an at least semi-automated manner.

In summary, a concept is thereby provided for the efficient infrastructure-based assistance of a motor vehicle driven in an at least semi-automated manner within a parking facility An infrastructure-based assistance of the motor vehicle means, in particular, that the motor vehicle is provided infrastructure assistance data. The motor vehicle may, for example, derive handling instructions based on the infrastructure assistance data. The motor vehicle may, for example, decide itself what to do based on the infrastructure assistance data.

Infrastructure assistance data include, for example, one or multiple of the following elements of data: control command for the at least semi-automated controlling of a transverse guidance and/or longitudinal guidance of the motor vehicle, remote control command for the at least semi-automated remote controlling of a transverse guidance and/or longitudinal guidance of the motor vehicle, enabling command for enabling an at least semi-automated, in particular fully-automated, drive of the motor vehicle for a particular period of time in a particular area of the parking facility, a setpoint trajectory for the motor vehicle, a target position within the parking facility, surroundings data, which represent surroundings of the motor vehicle, a preset for what the motor vehicle is to do. The preset specifies, for example, whether the motor vehicle may drive, for example, or must stop, for example.

The wording "in one specific embodiment of the system" used in this description includes the wording "in a specific embodiment of the system, the specific embodiment including, for example, the respective features of at least one of the specific embodiments described in the description." This means, therefore, that the respective features of the specific embodiments described in the description may, for example, be arbitrarily combined.

When "base unit" is in the singular, the plural is always to be implied and vice versa. Statements made in connection with a base unit apply analogously to multiple base units and vice versa.

When "surroundings sensor" is in the singular, the plural is always to be implied and vice versa. Statements made in connection with a surroundings sensor apply analogously to multiple surroundings sensors and vice versa.

A drive of the motor vehicle driven in an at least semi-automated manner is, for example, an AVP drive of the motor vehicle. Within the scope of an AVP drive, the motor vehicle is driven in an at least semi-automated manner, for example, from an initial position to a parking position, is parked at the parking position in an at least semi-automated manner, is unparked in an at least semi-automated manner after a parking time has elapsed or in response to a pick-up request and is driven in an at least semi-automated manner to a second position. At the initial position, for example, a driver of the motor vehicle parks his motor vehicle. The AVP process begins there. At the second position, for example, the driver retrieves his/her motor vehicle. The AVP process ends there. The first and the second position may be different or may be identical.

A drive of the motor vehicle driven in an at least semi-automated manner within the parking facility is an infrastructure-based drive of the motor vehicle, is thus a drive driven in an at least semi-automated manner, in which the motor vehicle receives aid or assistance via the infrastructure assistance data, which are ascertained with the aid of the base unit(s).

A surroundings sensor within the context of the description is, for example, one of the following surroundings sensors: radar sensor, LIDAR sensor, ultrasonic sensor, video sensor/camera (both mono camera and stereo camera), magnetic field sensor and infrared sensor.

In one specific embodiment of the method according to the second aspect of the present invention, it is provided that the method is a computer-implemented method.

Technical functionalities of the method according to second aspect result from corresponding technical functionalities of the system according to the first aspect and vice versa.

This means, therefore, that method features result from system features and vice versa.

The wording "at least semi-automated driving" includes one or multiple of the following cases: assisted driving, semi-automated driving, highly automated driving, fully automated driving.

Assisted driving means that a driver of the motor vehicle continually carries out either the transverse guidance or the longitudinal guidance of the motor vehicle. The respectively other driving task (i.e., a controlling of the longitudinal guidance or of the transverse guidance of the motor vehicle) is carried out automatically. This means, therefore, that during an assisted driving of the motor vehicle either the transverse guidance or the longitudinal guidance is controlled automatically.

Semi-automated driving means that in a specific situation (for example: driving on an expressway, driving within a parking facility, passing an object, driving within a traffic lane defined by traffic lane markings) and/or for a certain period of time, a longitudinal guidance and a transverse guidance of the motor vehicle are controlled automatically. A driver of the motor vehicle him/herself does not have to manually control the longitudinal guidance and transverse guidance of the motor vehicle. However, the driver must continually monitor the automatic control of the longitudinal guidance and transverse guidance in order to be able to manually intervene if needed. The driver must be prepared to take full driving control of the motor vehicle at any time.

Highly automated driving means that for a certain period of time in a specific situation (for example: driving on an expressway, driving within a parking facility, passing an object, driving within a traffic lane defined by traffic lane markings), a longitudinal guidance and a transverse guidance of the motor vehicle are controlled automatically. A driver of the motor vehicle him/herself does not have to manually control the longitudinal guidance and transverse guidance of the motor vehicle. The driver does not have to continually monitor the automatic control of the longitudinal guidance and transverse guidance in order to be able to manually intervene if needed. If needed, a take-over request is automatically output to the driver for taking control of the longitudinal guidance and transverse guidance, in particular, with a sufficient time reserve. The driver must therefore potentially be able to take control of the longitudinal guidance and the transverse guidance. Limits of the automatic control of the transverse guidance and the longitudinal guidance are automatically recognized. During highly automated driving, it is not possible to automatically bring about a minimal risk state in every initial situation.

Fully automated driving means that in a specific situation (for example: driving on an expressway, driving within a parking facility, passing an object, driving within a traffic lane defined by traffic lane markings), a longitudinal guidance and transverse guidance of the motor vehicle is controlled automatically. A driver of the motor vehicle him/herself does not have to manually control the longitudinal guidance and transverse guidance of the motor vehicle. The driver does not have to monitor the automatic control of the longitudinal guidance and transverse guidance in order to be able to manually intervene if needed. Prior to a termination of the automatic control of the transverse guidance and longitudinal guidance, a request is automatically made to the driver to assume the driving task (control of the transverse guidance and longitudinal guidance of the motor vehicle), in particular, with a sufficient time reserve. If the driver does not assume the driving task, a return to a minimal risk situation takes place automatically. Limits of the automatic control of the transverse guidance and longitudinal guidance are automatically recognized. In all situations, it is possible to automatically return to a minimal risk system state. In the case of AVP, it may be a fully automated driving, the driver no longer even having to be in the motor vehicle. The motor vehicle may actually drive without a driver.

The terms "assist" and "aid" may be used synonymously.

"At least one" stands for "one or multiple".

The motor vehicle is configured, for example, to be driven in an at least semi-automated manner. The motor vehicle is, for example, an AVP motor vehicle. Such a motor vehicle is configured, in particular, to carry out an AVP operation. AVP stands for "Automated Valet Parking" and may be translated in German as "Automatischer Parkservice."

In one specific embodiment of the present invention, the system includes a parking facility management system, the first and the second base unit being communicatively linked to the parking facility management system, the first base unit being configured to transmit the first transfer data to the parking facility management system, the parking facility management system being configured to receive the first transfer data from the first base unit and to forward them to the second base unit, the second base unit being configured to receive the forwarded first transfer data from the parking facility management system.

This yields, for example, the technical advantage that the first transfer data are able to be efficiently forwarded. One further advantage is, in particular, that the first transfer data are centrally available, i.e., are able to be centrally processed by the parking facility management system.

The parking facility management system is configured, for example, to operate the parking facility, the operation including, for example, a planning of a drive of the motor vehicle in an at least semi-automated manner within the parking facility in order to ascertain planning data corresponding to the planning.

The first and/or the second base unit is/are, for example, configured to ascertain the corresponding, i.e., the first and/or the second infrastructure assistance data based on the planning data.

According to this specific example embodiment of the present invention, system functionalities, which are required for an AVP process (AVP stands for "Automated Valet Parking" and may be translated into German as "Automatischer Parkservice") are divided into two subsystems:

A first subsystem, which may be referred to as the main system, is the parking facility management system which, as a functionality, operates the parking facility. The operation includes, in particular, a planning of a drive of a motor vehicle, in particular, of multiple motor vehicles, driven in an at least semi-automated manner within the parking facility, in particular, an AVP drive of the motor vehicle,
and
a second subsystem which, as a functionality, includes the ascertainment of infrastructure assistance data, the second subsystem including the base units.

The ascertainment of infrastructure assistance data based on surroundings sensor data according to this specific embodiment is not carried out, for example, with the aid of the parking facility management system, rather the base units self-sufficiently ascertain the infrastructure assistance data and thus self-sufficiently aid the motor vehicle during the drive driven in an at least semi-automated manner, in particular, during an AVP drive.

In one specific example embodiment of the system, it is provided that the first base unit is configured to transmit the first transfer data directly to the second base unit, the second base unit being configured to receive the directly transmitted first transfer data directly from the first base unit.

This yields, for example, the technical advantage that the first transfer data are able to be efficiently and rapidly transmitted to the second base unit.

In one specific example embodiment of the present invention, the system includes a parking facility management system, the first and the second base unit being communicatively linked to the parking facility management system, the first base unit being configured to transmit the first transfer data to the parking facility management system, the parking facility management system being configured to receive the first transfer data from the first base unit and to forward them to the second base unit, the second base unit being configured to receive the forwarded first transfer data from the parking facility management system, the first base unit being configured to transmit the first transfer data directly to the second base unit, the second base unit being configured to receive the directly transmitted first transfer data directly from the first base unit.

This specific embodiment is thus a combination of the two preceding specific embodiments. This means that on the one hand the first transfer data are transmitted to the parking facility management system, which forwards them to the second base unit. On the other hand, it is provided that the first base unit transmits the first transfer data directly to the second base unit.

This yields, in particular, the technical advantage that the first transfer data on the one hand are able to be efficiently and rapidly transferred to the second base unit, moreover, with the additional transfer, i.e., with the forwarding, of the first transfer data by the parking facility management system to the second base unit, these forwarded first transfer data being capable of being used in order to check the directly transmitted transfer data. Redundant data are thus available.

For example, the second base unit checks the directly transmitted transfer data with the transfer data forwarded with the aid of the parking facility management system. In the case of a discrepancy, for example, the check is repeated. In the case of an initially established discrepancy or after the establishment of a predetermined number of discrepancies, it is determined that an error is present. In response to this determination, the motor vehicle is brought into a safe state, for example, to a standstill.

In one specific example embodiment of the present invention, it is provided that the first transfer data include one or multiple elements selected from the following group of transfer data: certificate of a secure communication link between the motor vehicle and the first base unit, motor vehicle data, motor vehicle position, motor vehicle velocity, planned route of the motor vehicle, target position of the motor vehicle, first surroundings data, result of an analysis of the first surroundings sensor data.

This yields, for example, the technical advantage that particularly suitable transfer data are able to be used.

A secure communication link is, for example, an encrypted communication link. The transfer data preferably include multiple certificates of a secure communication link between the motor vehicle and the first base unit.

A result of an analysis of the first surroundings sensor data includes, for example, a result of a vacant space recognition and/or an object detection based on the first surroundings sensor data. This means, for example, that the analysis includes, for example, an object recognition and/or, for example, a vacant space recognition.

In one specific example embodiment of the present invention, the system includes a first and a second wireless communication interface, the first wireless communication interface being assigned to the first base unit and being configured to transmit the first infrastructure assistance data to the motor vehicle, the second wireless communication interface being assigned to the second base unit and being configured to transmit the second infrastructure assistance data to the motor vehicle.

This yields, for example, the technical advantage that the corresponding infrastructure assistance data are able to be efficiently transmitted to the motor vehicle.

In one specific example embodiment of the present invention, it is provided that the first wireless communication interface is integrated in the first base unit or is formed separately therefrom and is communicatively linked therewith and/or the second wireless communication interface being integrated in the second base unit or being formed separately therefrom and being communicatively linked therewith.

This yields, for example, the technical advantage that the corresponding communication interface is able to be efficiently implemented.

In one specific example embodiment of the present invention, it is provided that the at least one wireless communication interface is part of a central communication gateway.

This yields, for example, the technical advantage that the wireless communication interface is able to be efficiently implemented. This further yields the advantage that a number of required communication interfaces are able to be efficiently reduced, since, for example, the at least one wireless communication interface may be accessed via the central communication gateway also by further base units in order to transmit the corresponding infrastructure assistance data to the motor vehicle. Thus, not every base unit must include a dedicated wireless communication interface, which is further described below.

In one specific example embodiment of the system of the present invention, it is provided that at least one base unit includes in each case at least one wireless communication interface.

This yields, for example, the technical advantage that the wireless communication interface is able to be efficiently implemented.

At this point, it is noted that not every base unit must include a wireless communication interface. A base unit without a wireless communication interface may communicate, for example, with the aid of the wireless communication interface of the adjacent base unit, i.e., may transmit infrastructure assistance data to the motor vehicle with the aid of the wireless communication interface of the adjacent base unit.

According to one specific example embodiment of the system of the present invention, it is provided that each base unit includes a dedicated wireless communication interface.

According to one specific example embodiment of the system of the present invention, it is provided that only some of the base units in each case include a dedicated wireless communication interface.

When an exemplary system is described in the description, in which each of the base units in each case includes a dedicated wireless communication interface, then the corresponding statements also apply for a system in which only some of the base units in each case includes a dedicated wireless communication interface.

A wireless communication interface within the context of the description herein is, for example, situated separately from the base units within the parking facility. For example, one or multiple base units each includes/include a dedicated wireless communication interface. For example, one or multiple base units in each case includes/include no dedicated wireless communication interface, i.e., that these base units are free of a dedicated wireless communication interface. For example, one or multiple wireless communication interfaces is/are situated separately from the base units within the parking facility, for example, mounted at a ceiling and/or at a column and/or at a wall. A base unit without a dedicated wireless communication interface may, for example, use such a wireless communication interface in order to communicate with the motor vehicle, i.e., in order to transmit the infrastructure assistance data to the motor vehicle.

A wireless communication interface within the context of the description is situated, for example, within the parking facility.

A base unit includes, for example: a first network switch, which enables the connection to two or more adjacent base units, a second network switch, which makes it possible to connect this switch to all surroundings sensors around the base unit, a computer for executing algorithms, the computer including, for example, a standard x86 CPU, the computer including, for example, one or multiple processors and, for example, a wireless communication interface, which is, for example, a WLAN access point, in order to enable a wireless connection to the (AVP) motor vehicle.

The base unit according to one specific example embodiment of the system of the present invention is connected via the first network switch to two or more adjacent base units. The base unit according to one specific embodiment of the system is connected via the second network switch to the corresponding surroundings sensors.

The first and/or the second network switch according to one specific embodiment of the system may also be used for a communication link between a base unit and the park facility management system.

The exemplary embodiments and specific embodiments described herein may be arbitrarily combined with one another, even if this is not explicitly described.

DETAILED DESCRIPTION OF EXAMPLE EMBODIMENTS

Exemplary embodiments of the present invention are represented in the figures and explained in greater detail in the following description.

DETAILED DESCRIPTION OF EXAMPLE EMBODIMENTS

Figure 1:
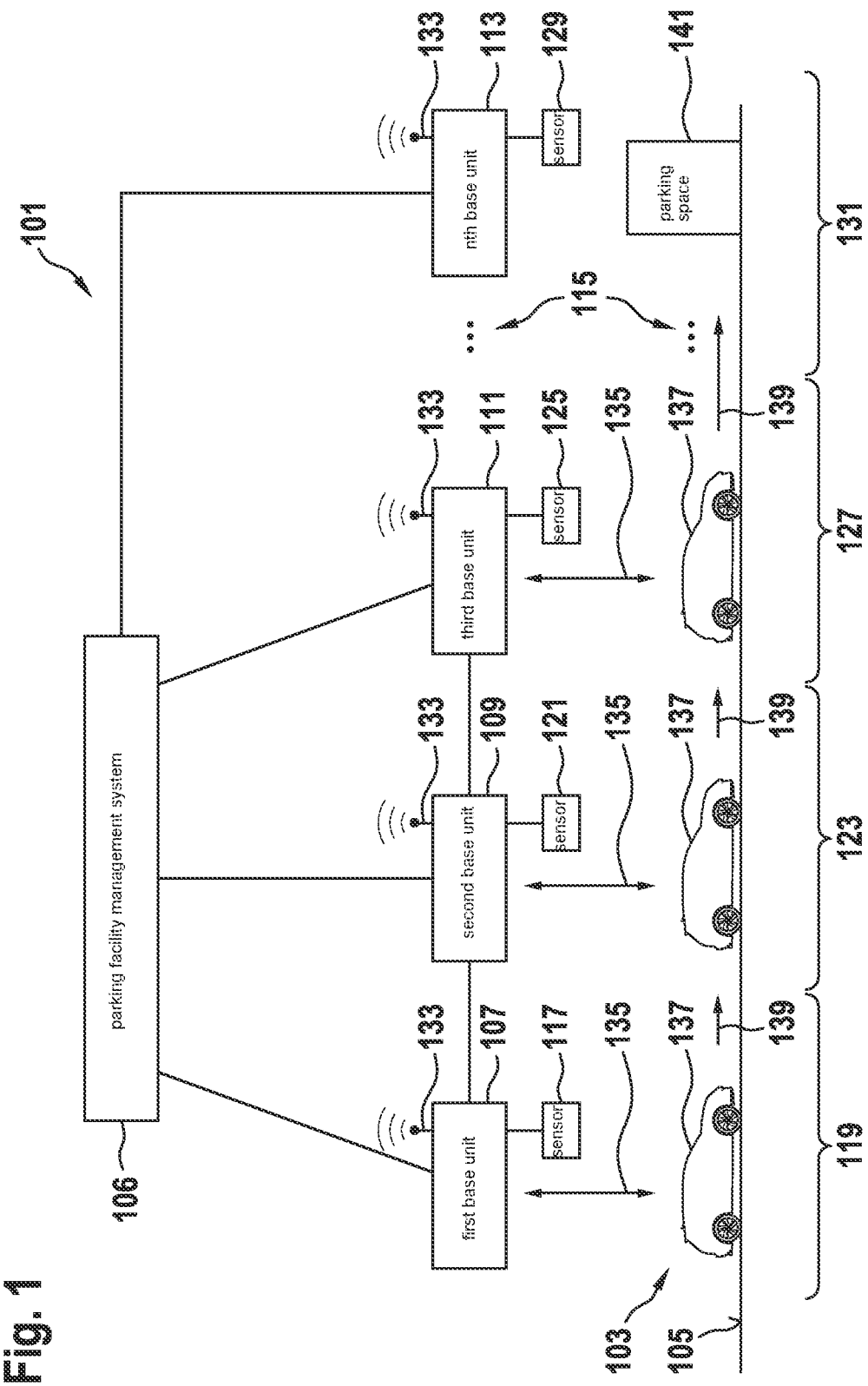
FIG. 1 shows a first system according to the first aspect of the present invention.

In the following, identical reference numerals may be used for identical features.

FIG. 1 shows a system 101 for the infrastructure-based assistance of a motor vehicle driven in an at least semi-automated manner within a parking facility 103.

Parking facility 103 includes a roadway 105.

System 101 includes a parking facility management system 106.

System 101 includes a first base unit 107, a second base unit 109, a third base unit 111 and an nth base unit 113. For example, n is a natural number and equal to or greater than or equal to 3. Thus, for example, the possibility of still further base units being located between third base unit 111 and nth base unit 113 is marked symbolically by three dots with reference numeral 115.

First base unit 107 is connected to a first surroundings sensor 117, which detects a first area 119 of parking facility 103. Second base unit 109 is connected to a second surroundings sensor 121, which detects a second area 123 of parking facility 103. Third base unit 111 is connected to a third surroundings sensor 125, which detects a third area 127 of parking facility 103. The nth base unit 113 is connected to an nth surroundings sensor 129, which detects an nth area 131 of parking facility 103. Thus, the possibility of still further areas being located between third area 127 and nth area 131, which are detected by further surrounding sensors, which are connected to further base units, is also marked symbolically by three dots with reference numeral 115.

In one specific embodiment not shown, multiple first surroundings sensors 117 and/or multiple second surroundings sensors 121 and/or multiple third surroundings sensors 125 and/or multiple nth surroundings sensors 129 are provided.

This means that the base units may be connected in each case to multiple surroundings sensors.

A motor vehicle 137 is driven in an at least semi-automated manner on roadway 105 within parking facility 103. During this drive of motor vehicle 137 driven in an at least semi-automated manner, motor vehicle 137 is aided by system 101. In particular, first base unit 107 aids motor vehicle 137 during a drive within first area 119 driven in an at least semi-automated manner. Second base unit 109 aids the drive of motor vehicle 137 through second area 123 driven in an at least semi-automated manner. Similarly, third base unit 111 aids motor vehicle 137 during its drive through third area 127 driven in an at least semi-automated manner. Similarly, nth base unit 113 aids motor vehicle 137 during a drive within nth area 131 driven in an at least semi-automated manner.

Merely as an example, nth area 131 includes a parking space 141, at which motor vehicle 137 is to be parked in an at least semi-automated manner. Motor vehicle 137 drives in driving direction 139 through the areas in the direction of parking space 141. Direction 139 extends from left to right in relation to the paper plane.

First base unit 107 is configured to ascertain first infrastructure assistance data for the infrastructure-based assistance of motor vehicle 137 during its at least semi-automated drive through first area 119 based on first surroundings sensor data of first surroundings sensor 117 representing detected first area 119.

Similarly, second base unit 109 is configured to ascertain second infrastructure assistance data for the infrastructure-based assistance of motor vehicle 137 during an at least semi-automated drive through second area 123 based on second surroundings sensor data of second surroundings sensor 121 representing detected second area 123.

Similarly, third base unit 111 is configured to ascertain third infrastructure assistance data for the infrastructure-based assistance of motor vehicle 137 during an at least semi-automated drive through third area 127 based on the detected third surroundings sensor data of third surroundings sensor 125 representing third area 127.

Similarly, nth base unit 113 is configured to ascertain nth infrastructure assistance data for the infrastructure-based assistance of motor vehicle 137 during an at least semi-automated drive through the nth area 131 based on nth surroundings sensor data of nth surroundings sensor 129 representing detected nth area 131.

The base units each include a wireless communication interface 133, which is configured to transmit the correspondingly ascertained infrastructure assistance data to motor vehicle 137. A communication between motor vehicle 137 and the corresponding base unit is marked symbolically by double arrows with reference numeral 135.

Base units 107, 109, 111, 113 are connected in series to one another. This means that base units 107, 109, 111, 113 are connected to one another according to a daisy chain topology.

Base units 107, 109, 111, 113 are further communicatively linked in each case to parking facility management system 106.

First base unit 107 is configured to ascertain first transfer data for the transfer of the infrastructure-based assistance of motor vehicle 137 from first base unit 107 to second base unit 109. Second base unit 109 is configured to take over the infrastructure-based assistance of motor vehicle 137 from first base unit 107 based on the first transfer data, second base unit 109 being configured to ascertain the second infrastructure assistance data based on the first transfer data.

Similarly, second base unit 109 is configured to ascertain second transfer data for the transfer of the infrastructure-based assistance of the motor vehicle from second base unit 109 to third base unit 111. Third base unit 111 is configured to take over the infrastructure-based assistance of motor vehicle 137 from second base unit 109 based on the second transfer data, third base unit 111 being configured to ascertain the third infrastructure assistance data based on the second transfer data.

Similarly, (1)th base unit is configured to ascertain (n−1)th transfer data for the transfer of the infrastructure-based assistance of motor vehicle 137 from (n−1)th base unit to nth base unit 113. The nth base unit 113 is configured to take over the infrastructure-based assistance of motor vehicle 137 from (n−1)th base unit based on the (n−1)th transfer data, nth base unit 113 being configured to ascertain nth infrastructure assistance data based on the (n−1)th transfer data.

The corresponding transfer data may, for example, be transmitted to the corresponding base unit as follows.

For example, it is provided that the transfer data are transmitted directly from one base unit to the next base unit. This means, therefore that the base units forward or transfer the corresponding transfer data between one another.

For example, it is provided that the corresponding transfer data are not directly transmitted but are initially transmitted from the corresponding base unit to parking facility management system 106, which then forwards these transfer data to the next base unit.

For example, it is provided according to one specific embodiment that both the base units transfer the corresponding transfer data directly between one another. On the other hand, it is provided that the base units also transmit the corresponding transfer data to parking facility management system 106, which then forwards these data to the corresponding base units.

Figure 2:
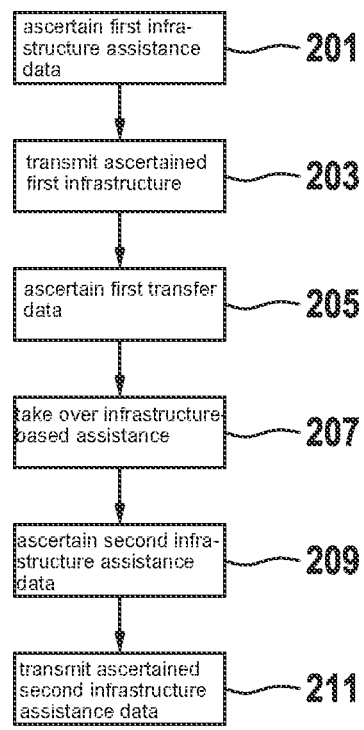
FIG. 2 shows a flowchart of a method according to the second aspect of the present invention.

FIG. 2 shows a flowchart of a method for the infrastructure-based assistance of a motor vehicle driven in an at least semi-automated manner within a parking facility using the system according to the first aspect, including the following steps: ascertaining 201 with the aid of the first base unit first infrastructure assistance data for the infrastructure-based assistance of the motor vehicle during an at least semi-automated drive through the first area based on the first surroundings sensor data, transmitting 203 the ascertained first infrastructure assistance data with the aid of the at least one wireless communication interface to the motor vehicle, ascertaining 205 first transfer data for the transfer of the infrastructure-based assistance of the motor vehicle from the first base unit to the second base unit with the aid of the first base unit, taking over 207 the infrastructure-based assistance of the motor vehicle from the first base unit based on the first transfer data with the aid of the second base unit, ascertaining 209 with the aid of the second base unit second infrastructure assistance data for the infrastructure-based assistance of the motor vehicle during an at least semi-automated drive through the second area based on the second surroundings sensor data and based on the first transfer data, transmitting 211 the ascertained second infrastructure assistance data with the aid of at least one wireless communication interface to the motor vehicle.

Figure 3:
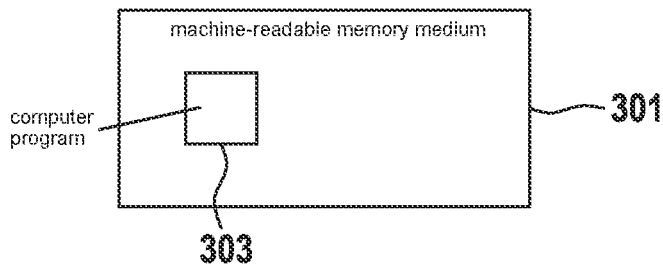
FIG. 3 shows a machine-readable memory medium according to the fourth aspect of the present invention.

FIG. 3 shows a machine-readable memory medium 301, on which a computer program 303 is stored. Computer program 303 includes commands which, when computer program 303 is executed by a computer, for example, by the system according to the first aspect, prompt the computer to carry out a method according to the second aspect.

In summary, the concept includes, for example, a system for the infrastructure-based assistance of a motor vehicle driven in an at least semi-automated manner within a parking facility, including:

multiple base units, which are connected in each case to a surroundings sensor, which detect in each case an area of the parking facility. The base units assist the motor vehicle during its drive through the respective area driven in an at least semi-automated manner based on surroundings sensor data of the respective surrounding sensor corresponding to the respective detection. In particular, infrastructure assistance data are ascertained based on the surroundings sensor data, which are transmitted wirelessly to the motor vehicle. Each base unit is responsible for one area. The responsibility for assisting the motor vehicle is transferred from base station to base station as the motor vehicle drives through the individual areas. To effectuate a defined transfer of the infrastructure-based assistance of the motor vehicle, it is provided, with the aid of the one base station, to ascertain transfer data for a transfer of the infrastructure-based assistance of the motor vehicle from one base station to the next base station and to transmit these transfer data to the next base station, so that the latter takes over the infrastructure-based assistance of the motor vehicle.

What is claimed is:

1. A system for infrastructure-based assistance of a motor vehicle driven in an at least semi-automated manner within a parking facility, the system comprising:
a first base unit, which is situated within the parking facility, the first base unit being connected to a first surroundings sensor situated within the parking facility in surroundings of the first base unit and configured to detect a first area of the parking facility, the first base unit being configured to ascertain first infrastructure assistance data for the infrastructure-based assistance of the motor vehicle during an at least semi-automated drive through the first area based on first surroundings sensor data of the first surroundings sensor representing the detected first area;
a second base unit, which is situated within the parking facility spaced apart from the first base unit and is connected in series to the first base unit, the second base unit being connected to a second surroundings sensor situated within the parking facility in the surroundings of the second base unit and detecting a second area of the parking facility, the second base unit being configured to ascertain second infrastructure assistance data for the infrastructure-based assistance of the motor vehicle during an at least semi-automated drive through the second area based on second surroundings sensor data of the second surroundings sensor representing the detected second area, the first base unit being configured to, prior to a transfer of the infrastructure-based assistance of the motor vehicle from the first base unit to the second base unit and during the at least semi-automated drive through the first area, generate first transfer data for the transfer, the second base unit being configured to take over the infrastructure-based assistance of the motor vehicle from the first base unit based on the first transfer data and to perform the ascertainment of the second infrastructure assistance data based on the first transfer data generated by the first base unit prior to the transfer; and
at least one wireless communication interface, which is configured to transmit the first and second ascertained infrastructure assistance data to the motor vehicle.

2. The system as recited in claim 1, the system further comprising:
a parking facility management system, the first base unit and the second base unit being communicatively linked to the parking facility management system, the first base unit being configured to transmit the first transfer data to the parking facility management system, the parking facility management system being configured to receive the first transfer data from the first base unit and to forward them to the second base unit, the second base unit being configured to receive the forwarded first transfer data from the parking facility management system.

3. The system as recited in claim 1, wherein the first base unit is configured to transmit the first transfer data directly to the second base unit, the second base unit being configured to receive the directly transmitted first transfer data directly from the first base unit.

4. The system as recited in claim 1, wherein the first transfer data include one or multiple elements selected from the following group of transfer data: certificate of a secure communication link between the motor vehicle and the first base unit, motor vehicle data, motor vehicle position, motor vehicle velocity, planned route of the motor vehicle, target position of the motor vehicle, first surroundings data, result of an analysis of the first surroundings sensor data.

5. The system as recited in claim 1, further comprising a first and a second wireless communication interface, the first wireless communication interface being assigned to the first base unit and being configured to transmit the first infrastructure assistance data to the motor vehicle, the second wireless communication interface being assigned to the second base unit and being configured to transmit the second infrastructure assistance data to the motor vehicle.

6. The system as recited in claim 5, wherein the first wireless communication interface is integrated in, or is formed separately from, the first base unit and is communicatively linked to the first base unit and/or the second wireless communication interface being integrated in, or being formed separately from, the second base unit and being communicatively linked to the second base unit.

7. The system as recited in claim 1, wherein the at least one wireless communication interface is part of a central communication gateway.

8. A method for the infrastructure-based assistance of a motor vehicle driven in an at least semi-automated manner within a parking facility using a system including:
a first base unit, which is situated within the parking facility, the first base unit being connected to a first surroundings sensor situated within the parking facility in surroundings of the first base unit and configured to detect a first area of the parking facility, the first base unit being configured to ascertain first infrastructure assistance data for the infrastructure-based assistance of the motor vehicle during an at least semi-automated drive through the first area based on first surroundings sensor data of the first surroundings sensor representing the detected first area;
a second base unit, which is situated within the parking facility spaced apart from the first base unit and is connected in series to the first base unit, the second base unit being connected to a second surroundings sensor situated within the parking facility in the surroundings of the second base unit and detecting a second area of the parking facility, the second base unit being configured to ascertain second infrastructure assistance data for the infrastructure-based assistance of the motor vehicle during an at least semi-automated drive through the second area based on second surroundings sensor data of the second surroundings sensor representing the detected second area, the first base unit being configured to, prior to a transfer of the infrastructure-based assistance of the motor vehicle from the first base unit to the second base unit and during the at least semi-automated drive through the first area, generate first transfer data for the transfer, the second base unit being configured to take over the infrastructure-based assistance of the motor vehicle from the first base unit based on the first transfer data and to perform the ascertainment of the second infrastructure assistance data based on the first transfer data generated by the first base unit prior to the transfer; and at least one wireless communication interface, which is configured to transmit the first and second ascertained infrastructure assistance data to the motor vehicle;

wherein the method comprises the following steps:

ascertaining using the first base unit the first infrastructure assistance data for the infrastructure-based assistance of the motor vehicle during an at least semi-automated drive through the first area based on the first surroundings sensor data;

transmitting the ascertained first infrastructure assistance data using the at least one wireless communication interface to the motor vehicle;

ascertaining the first transfer data for the transfer of the infrastructure-based assistance of the motor vehicle from the first base unit to the second base unit with the aid of the first base unit;

taking over the infrastructure-based assistance of the motor vehicle from the first base unit based on the first transfer data using the second base unit;

ascertaining using the second base unit second infrastructure assistance data for the infrastructure-based assistance of the motor vehicle during an at least semi-automated drive through the second area based on the second surroundings sensor data and based on the first transfer data; and transmitting the ascertained second infrastructure assistance data using the at least one wireless communication interface to the motor vehicle.

9. A non-transitory machine-readable memory medium on which is stored a computer program for the infrastructure-based assistance of a motor vehicle driven in an at least semi-automated manner within a parking facility using a system including:

a first base unit, which is situated within the parking facility, the first base unit being connected to a first surroundings sensor situated within the parking facility in surroundings of the first base unit and configured to detect a first area of the parking facility, the first base unit being configured to ascertain first infrastructure assistance data for the infrastructure-based assistance of the motor vehicle during an at least semi-automated drive through the first area based on first surroundings sensor data of the first surroundings sensor representing the detected first area;

a second base unit, which is situated within the parking facility spaced apart from the first base unit and is connected in series to the first base unit, the second base unit being connected to a second surroundings sensor situated within the parking facility in the surroundings of the second base unit and detecting a second area of the parking facility, the second base unit being configured to ascertain second infrastructure assistance data for the infrastructure-based assistance of the motor vehicle during an at least semi-automated drive through the second area based on second surroundings sensor data of the second surroundings sensor representing the detected second area, the first base unit being configured to, prior to a transfer of the infrastructure-based assistance of the motor vehicle from the first base unit to the second base unit and during the at least semi-automated drive through the first area, generate first transfer data for the transfer, the second base unit being configured to take over the infrastructure-based assistance of the motor vehicle from the first base unit based on the first transfer data and to perform the ascertainment of the second infrastructure assistance data based on the first transfer data generated by the first base unit prior to the transfer; and at least one wireless communication interface, which is configured to transmit the first and second ascertained infrastructure assistance data to the motor vehicle;

wherein the computer program, when executed by a computer, causing the computer to perform the following steps:

ascertaining using the first base unit the first infrastructure assistance data for the infrastructure-based assistance of the motor vehicle during an at least semi-automated drive through the first area based on the first surroundings sensor data;

transmitting the ascertained first infrastructure assistance data using the at least one wireless communication interface to the motor vehicle;

ascertaining the first transfer data for the transfer of the infrastructure-based assistance of the motor vehicle from the first base unit to the second base unit with the aid of the first base unit;

taking over the infrastructure-based assistance of the motor vehicle from the first base unit based on the first transfer data using the second base unit;

ascertaining using the second base unit second infrastructure assistance data for the infrastructure-based assistance of the motor vehicle during an at least semi-automated drive through the second area based on the second surroundings sensor data and based on the first transfer data; and transmitting the ascertained second infrastructure assistance data using the at least one wireless communication interface to the motor vehicle.

* * * * *